United States Patent Office 3,063,969
Patented Nov. 13, 1962

3,063,969
4-VINYL TRIMELLITATE AND/OR ANHYDRIDE AND POLYMERS THEREOF
James R. Stephens, Gary, and Richard E. Van Strien, Griffith, Ind., assignors to Standard Oil Company, Chicago, Ill., a corporation of Indiana
No Drawing. Filed Sept. 14, 1959, Ser. No. 839,566
9 Claims. (Cl. 260—78.4)

This invention relates to the novel compounds 4-vinyl trimellitate and 4-vinyl trimellitate anhydride and to methods of preparation of these compounds.

4-vinyl trimellitate and 4-vinyl trimellitate anhydride are derivatives of trimellitic anhydride (anhydro trimellitic acid). A structural configuration of 4-vinyl trimellitate anhydride is set out below:

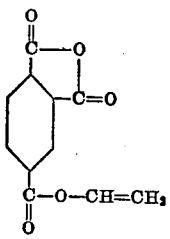

A structural configuration of 4-vinyl trimellitate is set out below:

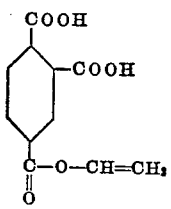

4-vinyl trimellitate anhydride is prepared by reacting trimellitic anhydride and vinyl acetate. For each mole of trimellitic anhydride at least one mole of vinyl acetate is used. Preferably from about two to about ten moles of vinyl acetate per mole of the anhydride are used. Under the preferred conditions the excess vinyl acetate serves as the solvent. The amount of vinyl acetate can be maintained at a minimum by conducting the reaction in the presence of a suitable organic solvent such as acetone.

The reaction of 4-vinyl trimellitic anhydride and vinyl acetate is conducted in the presence of catalytic amounts of a mercuric salt of a mineral acid, suitable mineral acids are sulfuric, nitric and orthophosphoric. Preferred species of salt are mercuric sulfate, mercuric nitrate and mercuric phosphate.

The reaction of trimellitic anhydride and vinyl acetate is carried out at temperatures in the range of about 0° C. to about 100° C. A reaction time of about three to five hours is sufficient to convert essentially all of the anhydride to the desired product at a temperature of about 80° C. while several days may be required at a low temperature. The reaction is preferably carried out in the liquid phase. Therefore, temperature and pressure must be regulated accordingly.

It has been found that the reaction of trimellitic acid and vinyl acetate forms a mixture of mono-, di-, and trivinyl isomers. However, the reaction of trimellitic anhydride and vinyl acetate forms essentially pure 4-vinyl trimellitate anhydride. Mixtures of trimellitic acid and trimellitic anhydride, reacted with vinyl acetate, form an impure product. Therefore, it is essential to conduct the reaction under anhydrous conditions when pure 4-vinyl trimellitate anhydride is desired.

4-vinyl trimellitate is prepared by contacting 4-vinyl trimellitate anhydride with water in an amount sufficient to convert the anhydride group to carboxyl groups. Preferably, this conversion is carried out at a temperature from about 50° C. to about 100° C.

Preparation of the 4-vinyl trimellitate anhydride and 4-vinyl trimellitate and the utilization of these compounds is illustrated by the following examples:

*Example 1.*—A 3-liter flask fitted with a stirrer and reflux condenser protected from atomspheric moisture was charged with 482 g. (2.52 moles) of trimellitic anhydride, 1120 g. (13.0 moles) of vinyl acetate, and 7.02 g. of mercuric acetate. The reaction mixture was stirred and 2.65 g. of 100% sulfuric acid was added. The reaction mixture was then refluxed four hours. Upon cooling in a Dry Ice-acetone bath precipitation of the 4-vinyl trimellitate anhydride started. The contents of the flask were then warmed to room temperature and filtered to separate the crude product which weighed 190 g.

The crude product was dissolved in hot heptane and recrystallized therefrom. This purified product had a melting point of 129° C. The saponification number (mg. of KOH equivalent to 1 g. of sample) of the purified material was 778 (theoretical value 772) and the iodine number was 102 (g. $I_2$ per 100 g. of sample). The molecular weight of the purified product determined by an ebullioscopic technique was 218 which is the calculated value for 4-vinyl trimellitate anhydride.

*Example 2.*—A mixture of 96.1 g. (0.50 mole) of trimellitic anhydride, 285 g. (3.0 moles) of vinyl acetate, 0.05 g. of copper resinate, 1.4 g. of mercuric acetate, and 0.30 g. of concentrated sulfuric acid was stirred four days at 25° C. After standing an additional nine days the solid was separated by filtration.

The copper resinate was included in the reaction as a polymerization inhibitor. Copper resinate is the reaction product of cupric sulfate and rosin oil, the fraction of crude turpentine boiling above 360° C.

The crude recovered product, 4-vinyl trimellitic anhydride, weighed 43.2 g., had a melting point of 114–125° C. On recrystallization from heptane the 4-vinyl trimellitate anhydride had a melting point of 127–28° C. and an iodine number of 93.4. The purified material was inspected by infra-red technique which showed the presence of vinyl ester bands. This purified product was inspected by mass spectrometric procedure and showed a parent peak corresponding to 218 which is the theoretical value for 4-vinyl trimellitate anhydride.

*Example 3.*—A one-liter flask fitted with a stirrer and reflux condenser protected from atmospheric moisture was charged with 192.1 g. (1.00 mole) of trimellitic anhydride, 488 g. (5.68 moles) of vinyl acetate, and 0.10 g. of copper resinate. The mercuric sulfate catalyst was prepared by mixing 2.8 g. of mercuric acetate and 0.78 g. of concentrated $H_2SO_4$ in a separate vessel. The catalyst was added and the material in the reaction vessel was stirred and heated at reflux for five hours. The hot liquid was then filtered from a trace of insoluble material. The filtered liquid was cooled to 0°; during the cooling 97.4 g. of solid material precipitated. Seeding with a small amount of previously prepared 4-vinyl trimellitate anhydride accelerated the precipitation of the solid product. The crude solid 4-vinyl trimellitate anhydride was separated from the mother liquor by filtration.

The recovered solid product had a melting point of 115–120° C. This crude material was dissolved in hot heptane and reprecipitated therefrom. This purified product had a melting point of 125° C.

*Example 4.*—Ten grams of 4-vinyl trimellitate anhydride prepared by Example 2 was contacted with boiling water. On cooling the solution to room temperature, the solid product precipitated. The 4-vinyl trimellitate was separated by filtration and dried. The product had an acid number of 482 (mg. of KOH/g.) and gave tests for unsaturation with bromine and with potassium permanganate. Inspection of the product by infra-red technique showed the presence of vinyl ester bands.

4-vinyl trimellitate anhydride and 4-vinyl trimellitate are useful compounds for making polymers and copolymers which can be used as coatings and thermosetting resins. Suitable compounds for copolymerization are, vinyl acetate and acrylonitrile. The subject compounds may also be reacted with glycols, epoxides, etc. to produce unsaturated polyesters which can be used in surface coatings, adhesives, and molding compositions.

4-vinyl trimellitate anhydride and 4-vinyl trimellitate are suitable as monomers in polymerization reactions utilizing a suitable polymerization catalyst. Free radical polymerization initiator type catalysts are preferred. Examples of the preferred catalysts are t-butyl peroxide, benzoyl peroxide, and potassium persulfate.

The polymerization of these compounds is carried out in bulk or in the presence of a suitable solvent for the particular monomer. To illustrate, 4-vinyl trimellitate anhydride may be polymerized in dioxane at a temperature from about 50° C. to about 200° C. Further to illustrate, 4-vinyl trimellitate is polymerized at temperatures from about 50° C. to about 150° C. and is particularly unique because it can be polymerized in water solution to produce water soluble polymers. The polymers obtained from both of these monomers are solids at atmospheric temperature; that is, temperatures below about 57° C.

Clear films can be readily cast from dimethylformamide solution of the polymer prepared from 4-vinyl trimellitate anhydride and from water solutions of the polymer prepared from 4-vinyl trimellitate. The polymers from both of the monomers are characterized by having acid numbers essentially the same as the monomers.

These polymers are useful as carboxyl containing compounds in reactions with hydroxyl containing compounds. Thus, poly 4-vinyl trimellitate may be reacted with glycols to produce polyester type resins which are thermosetting and insoluble in solvents such as dimethylformamide.

*Example 5.*—A four and a half gram sample of 4-vinyl trimellitate anhydride was melted in a large test tube immersed in an oil bath. Two hundredths of a gram of t-butyl peroxide was then added at a temperature of 133° C. The contents of the tube underwent a slow exotherm to 150° C. in 28 minutes. The temperature was maintained at 150° C. for an additional 77 minutes, during which time the viscosity of the melt increased considerably. The temperature was finally brought up to 185° in the next 30 minutes. The polymer was then poured out and cooled.

The product melted at approximately 100° C. and was soluble in dimethylformamide. The product had an acid number (mg. of KOH required to neutralize a one gram sample) of 530 (Theor.=514). It also had an iodine number of 35. The polymer was contaminated with some monomer which could be removed by extraction with acetone. Clear continuous films were obtained from the solution of the polymer in dimethylformamide. The films were soluble in dimethylformamide after baking for 30 minutes at 140° C.

*Example 6.*—Approximately 1 g. of polymer obtained in Example 5 was mixed with 0.25 g. of ethylene glycol and baked for 30 minutes at 140° C. A hard film which was insoluble in dimethylformamide was obtained.

*Example 7.*—A solution of 2.46 g. of 4-vinyl trimellitate anhydride, 4.78 g. of dioxane, and 0.005 g. of benzoyl peroxide was made up, purged with nitrogen, and placed in an oil bath at 111° C. Precipitation of polymer began in a few seconds. Heating was continued one hour. The precipitated polymer was separated by decantation and centrifuging, triturated with benzene, and washed many times with benzene and hexane. After drying the product melted at 160-175° C. The acid number of the product was 492 (Theor.=514). The polymer was soluble in dimethyl formamide and gave clear colorless continuous films from this solvent.

*Example 8.*—Ten grams of 4-vinyl trimellitate was dissolved in 90 g. of distilled water on a steam bath under a nitrogen purge. Two hundredths gram of potassium persulfate was added and the solution heated at 92–95° C. for 4 hours. However, polymerization was essentially complete in one hour. The solution could be evaporated down to a viscous aqueous solution of the polymer.

*Example 9.*—A mixture of 5 g. of 4-vinyl trimellitate, 50 ml. of water, 0.015 g. of $K_2S_2O_8$ and 0.010 g. of $NaHSO_3$ was made in a bottle, purged with nitrogen, stoppered, then placed in an oven at 60° C. for 16 hours. The mixture was still heterogeneous, the solid phase consisting of monomer. The temperature was raised to 90° C. effecting solution and 0.05 g. additional $K_2S_2O_8$ was added. Heating was continued for 22 hours. The solution was then evaporated on a steam bath to one-third of its original volume and cooled to room temperature to a very viscous aqueous solution. Evaporation could be continued to yield a brittle solid of decomposition point approximately 155° C. The acid number of the product was 495.

*Example 10.*—The polymer product of Example No. 9, dissolved in water to the extent of about 30% solids, was spread as a film and air dried at 60° C. in a few minutes to clear colorless films. The films were water soluble but unattacked by hexane and benzene.

*Example 11.*—Ethylene glycol was dissolved in the same aqueous polymer solution, spread and baked at 170° C. for 20 minutes, to give clear tough films which were insoluble in water, acetone, and benzene.

Thus having described the invention what is claimed is:

1. As a new composition of matter, a vinyl derivative of trimellitic anhydride selected from the class consisting of 4-vinyl trimellitate anhydride and 4-vinyl trimellitate.

2. 4-vinyl trimellitate anhydride.

3. 4-vinyl trimellitate.

4. The method of preparing 4-vinyl trimellitate anhydride which method comprises reacting, under anhydrous conditions at a temperature in the range of about 0° C. to about 100° C., trimellitic anhydride with vinyl acetate in a molar ratio of at least about one mole of vinyl acetate per mole of trimellitic anhydride in the presence of a catalytic amount of a mercuric salt of a mineral acid.

5. The method of claim 4 in which said temperature is between about 50° C. and about 90° C.

6. The method of claim 4 in which said mercuric salt is mercuric sulfate.

7. The method of preparing 4-vinyl trimellitate which method comprises reacting, under anhydrous conditions at a temperature in the range of about 0° to about 100° C., trimellitic anhydride with vinyl acetate in a molar ratio of at least about one mole of vinyl acetate per mole of trimellitic anhydride in the presence of a catalytic amount of a mercuric salt of a mineral acid, separating the 4-vinyl trimellitate anhydride and contacting said 4-vinyl trimellitate anhydride with water in an amount sufficient to form 4-vinyl trimellitate.

8. Polymeric 4-vinyl trimellitate anhydride having an acid number essentially the same as the monomer.

9. Polymeric 4-vinyl trimellitate having an acid number essentially the same as the monomer.

References Cited in the file of this patent

UNITED STATES PATENTS

| | | |
|---|---|---|
| 2,145,345 | Dreyfus et al. | Jan. 31, 1939 |
| 2,245,131 | Herrmann et al. | June 10, 1941 |
| 2,324,426 | Robie | July 13, 1943 |
| 2,332,896 | D'Alelio | Oct. 26, 1943 |
| 2,557,639 | Derr | June 19, 1951 |
| 2,595,852 | Hopper et al. | May 6, 1952 |
| 2,612,491 | Evans et al. | Sept. 30, 1952 |
| 2,756,219 | Van der Plas et al. | July 24, 1956 |
| 2,911,416 | Knobloch et al. | Nov. 3, 1959 |